(12) United States Patent
Johnston

(10) Patent No.: US 7,556,758 B2
(45) Date of Patent: Jul. 7, 2009

(54) HOLLOW WALL BASE

(75) Inventor: Curtis F. Johnston, Cleveland Heights, OH (US)

(73) Assignee: Johnsonite Inc., Chagrin Falls, OH (US)

(*) Notice: Subject to any disclaimer, the term of this patent is extended or adjusted under 35 U.S.C. 154(b) by 0 days.

(21) Appl. No.: 12/070,012

(22) Filed: Feb. 14, 2008

(65) Prior Publication Data

US 2008/0211144 A1 Sep. 4, 2008

Related U.S. Application Data

(62) Division of application No. 11/174,832, filed on Jul. 5, 2005, now abandoned.

(51) Int. Cl.
B29C 47/20 (2006.01)
B29C 47/90 (2006.01)

(52) U.S. Cl. .............. 264/172.1; 264/515; 264/150; 264/171.26; 264/178 R; 264/572

(58) Field of Classification Search ............ 264/171.26, 264/172.1, 150, 178 R, 572, 515
See application file for complete search history.

(56) References Cited

U.S. PATENT DOCUMENTS

| | | | | |
|---|---|---|---|---|
| 3,274,315 | A * | 9/1966 | Kawamura | ................. 264/563 |
| 3,676,974 | A | 7/1972 | Daly | |
| 3,812,230 | A * | 5/1974 | Takahashi | ................... 264/519 |
| 3,899,859 | A | 8/1975 | Smith | |
| 3,975,467 | A | 8/1976 | Beck | |
| 4,037,900 | A | 7/1977 | Schmidger | |
| 4,642,957 | A | 2/1987 | Edwards | |
| 4,663,906 | A | 5/1987 | Weinar | |
| 5,357,053 | A | 10/1994 | Manaras | |
| 5,598,681 | A | 2/1997 | DiGianni | |
| 5,752,356 | A | 5/1998 | Miklavic et al. | |
| 5,901,514 | A | 5/1999 | Wolfe | |
| 5,979,132 | A | 11/1999 | Margarit | |
| 6,191,363 | B1 | 2/2001 | Samuels | |
| 6,202,380 | B1 | 3/2001 | Trutwin et al. | |
| 6,216,406 | B1 | 4/2001 | Hauser | |
| 6,457,287 | B1 | 10/2002 | Wilcox | |
| D483,883 | S | 12/2003 | Glatz | |
| D483,884 | S | 12/2003 | Glatz | |
| 2003/0140583 | A1 | 7/2003 | Sauter | |

FOREIGN PATENT DOCUMENTS

WO WO 02/066764 8/2002

* cited by examiner

*Primary Examiner*—Richard Crispino
*Assistant Examiner*—Martin Rogers
(74) *Attorney, Agent, or Firm*—D. Peter Hochberg; Sean F. Mellino; Daniel J. Smola

(57) ABSTRACT

A method for manufacturing a flexible, extruded plastic wall base with a hollow core is presented. The method includes using extrusion die for heating and extruding plastics using a multi-functional insert within the die and air pressure to create a hollow core in the wall base. The hollow core allows less material to flow though the die so that the die stays hotter and the flow of the extruded plastic is not impeded. The resulting extruded plastic wall base is comprised of a generally thick portion, a generally thin portion and a profile on the face or front of the wall base.

8 Claims, 5 Drawing Sheets

HOLLOW WALL BASE

CROSS-REFERENCE TO RELATED APPLICATION

This application is a divisional of U.S. patent application Ser. No. 11/174,832 filed Jul. 5, 2005.

BACKGROUND OF THE INVENTION

1. Field of the Invention

The present invention relates generally to baseboards or wall bases. The invention relates more specifically to an extruded plastic wall base with a hollow core, and methods for making such a wall base.

2. Description of Prior Art

Baseboards and wall bases are known in the art as molding or trim applied at the base of a wall to complete the intersection of the wall and the floor. These wall bases decorate as well as protect the wall from scuffing and impact from feet, vacuum cleaners, wheelchairs, dollies, wheeled furniture, etc. Furthermore, the wall bases protect the edge of the carpet or flooring adjacent to the wall. In addition, the wall bases can hide unsightly electrical, telephone or other wires, protecting the wires from damage and people from tripping over these wires or inadvertently touching them.

A variety of wall bases exist, including those made of wood, metal and plastic. Wood wall bases are generally more expensive than plastic, and wood is considered to be more elegant, elaborate and traditional. However, the look of wood can be successfully emulated or evoked with well-constructed plastic wall bases. Complex wall base profiles can be extruded from plastic more easily than machined from wood. However, one disadvantage of using plastic is that solid plastic wall bases can be heavy, especially in contrast to wood wall bases. Extrusion molding of solid wall bases has additional problems. These solid wall bases are often quite thick and inflexible. Further, there may be warping or distortion due to uneven cooling of wall bases with uneven thicknesses and the solid, heavy, inflexible bases can be difficult to install. Moreover, warped or distorted wall bases may be unsightly.

In contrast to solid wall bases, those comprising one or two parts, with covers, are often used in conditions in which it is desired to install and hide telephone, electrical or other wires. In these situations, the wires are placed under the cover of the wall base. For example, U.S. Pat. No. 5,598,681 discloses a baseboard made from a resin material. This baseboard has two parts, a backwall which abuts with a room wall and a front cover. A hollow exists between the backwall and the front cover, and wires, such as telephone or electric wires, can be installed in this hollow space. A problem with the prior art is that the baseboard is comprised of more than one part, making manufacturing, shipping and installation difficult and expensive.

There is a need for a wall base which is lightweight, thinner than wood or solid plastic wall base, contains a minimal number of parts, and is easy and cost effective to manufacture, to ship and to install. The present invention fills the need for such a wall base in a unique manner.

SUMMARY OF THE INVENTION

An object of this invention is to provide a wall base which can be manufactured relatively quickly and easily.

A further object of this invention is to provide a plastic wall base which is lightweight and easy to handle.

Another object of this invention is to provide a plastic wall base which creates less scrap during its manufacture than prior art.

Yet another object of this invention is to provide a plastic wall base which is inexpensive to manufacture.

An additional object is to provide a plastic wall base which cools during manufacture in a uniform manner to avoid warping and distortion of the wall base.

It is an additional object to provide an integral wall base which can conceal wires.

A further object is to provide a wall base of complex configuration which can be molded in a fast manner without warping or incurring distortions to its shape.

Yet another object is the provision of a molded plastic wall base having a flat and curved front surface.

An additional object is to provide an extruded molded plastic wall base with thin and thick portions.

These and other objects will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE PREFERRED EMBODIMENT

Figure 1:
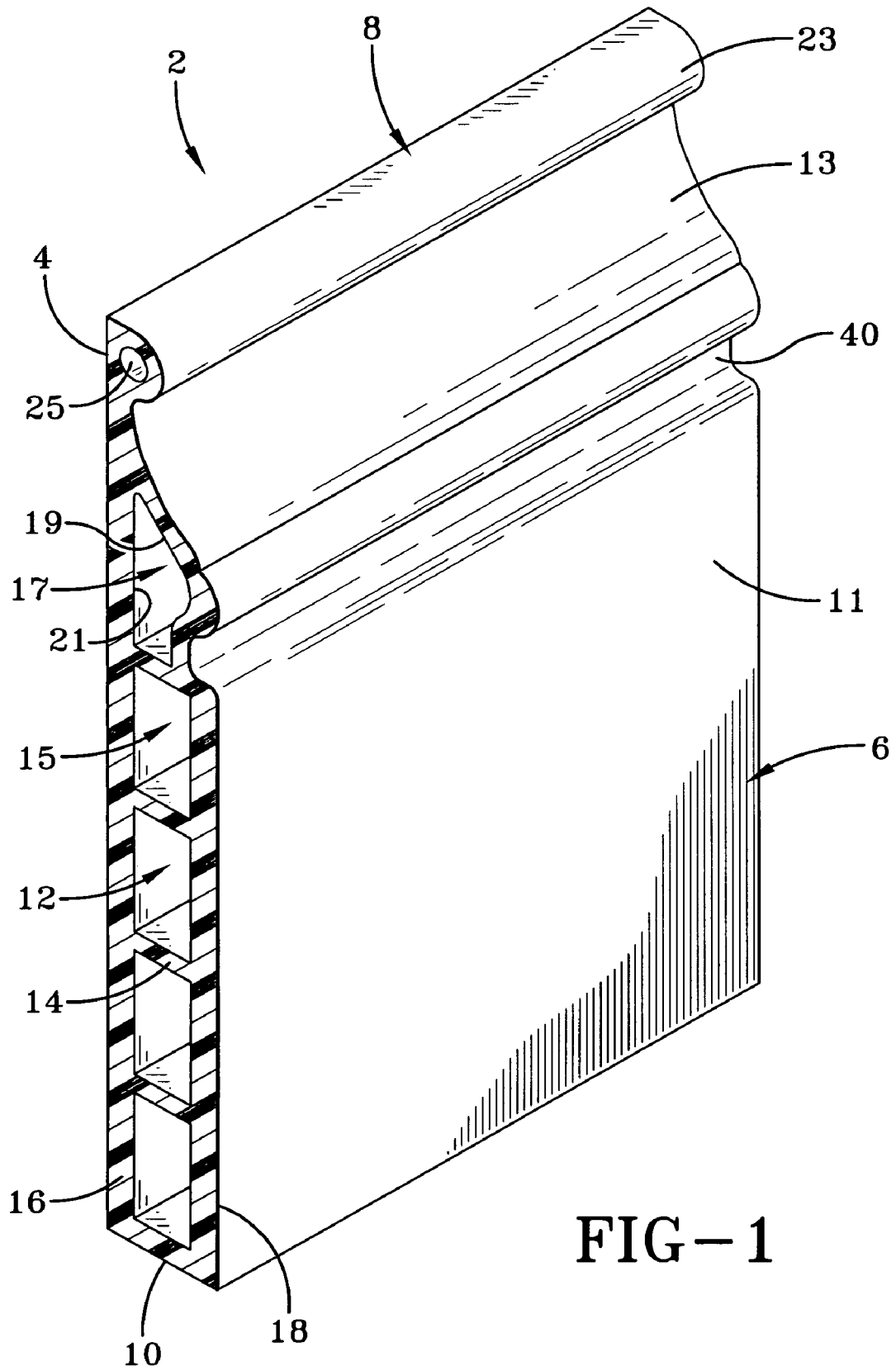
FIG. 1 is a perspective view of one embodiment of the wall base.

Referring to the drawings, which are used for illustration and not to limit the invention therewith, FIG. 1 shows a wall base 2 comprised of flexible plastic. The wall base 2 has a rear wall 4, a front wall or front surface 6, a top 8 and a bottom 10. The rear wall 4 is placed against a wall or other flat surface while the bottom 10 is placed against the floor or flooring surface. Front wall 6 has a lower flat portion 11 and a curved upper portion 13, although nearly any shape is possible according to the invention. Wall base 2 could be attached to a wall with bottom 10 slightly above the floor for receiving flooring such as tile, carpeting, planks, etc. beneath bottom 10. In a preferred embodiment, the wall base 2 is extruded and contains voids or hollowed out spaces 12 which generally follow the exterior shape of the wall base, having supports 14 between the front wall 6 and rear wall 4 for supporting rear wall 4, front wall 6 being the molding surface while the plastic is hot and thereafter. However, the wall base appears to be solid when viewed from the front. Wall base is preferably produced by extrusion molding as discussed below. The voids 12 are provided to yield a product having generally uniform thickness throughout for substantially uniform rates of heat flow during the heating and cooling incurred during the extrusion process while having the heated fluid plastic material flow to all parts of the wall base. When the wall base 2 is installed in a room, the cavities created by these voids, chambers or hollowed out spaces 12 can hold various electrical and other wires, which are threaded through a selected space 12. The thickness of the walls must be thick enough to absorb impact after attachment to a wall without breaking, and many moldable materials are resilient enough to achieve this thickness. Supports 14 extending transversely in the space between rear wall 4 and front wall 6 provide support against prolonged or impact forces on front wall 6 to prevent buckling, indention or piercing of front wall 6.

As explained above, spaces 12 provide a generally uniform wall thickness for each component of wall base 2 while giving the impression that wall base 2 has parts of varying thickness. Spaces 12 are preferably contoured to have the same configuration as the exterior of the part of wall base 11,13 in which the space is located, to provide each of the walls with uniform thickness to prevent warping of the walls during their heating and cooling in the extrusion process. Thus, spaces 15 are rectangular, although they are broken up by supports 14. However, space 17 is defined by forward, interior curved wall 19 which generally matches that portion of curved portion 13 behind which space 17 is located. Likewise, the flat rear part of space 17 is defined by flat wall 21. Spaces 12, 15, 17 do not necessarily have to be the same shape as the walls surrounding them. For example, a generally semi-hemispheric top bead 23 described further below, has a cylindrical space 25, but the walls are a generally uniform thickness.

Figure 4:
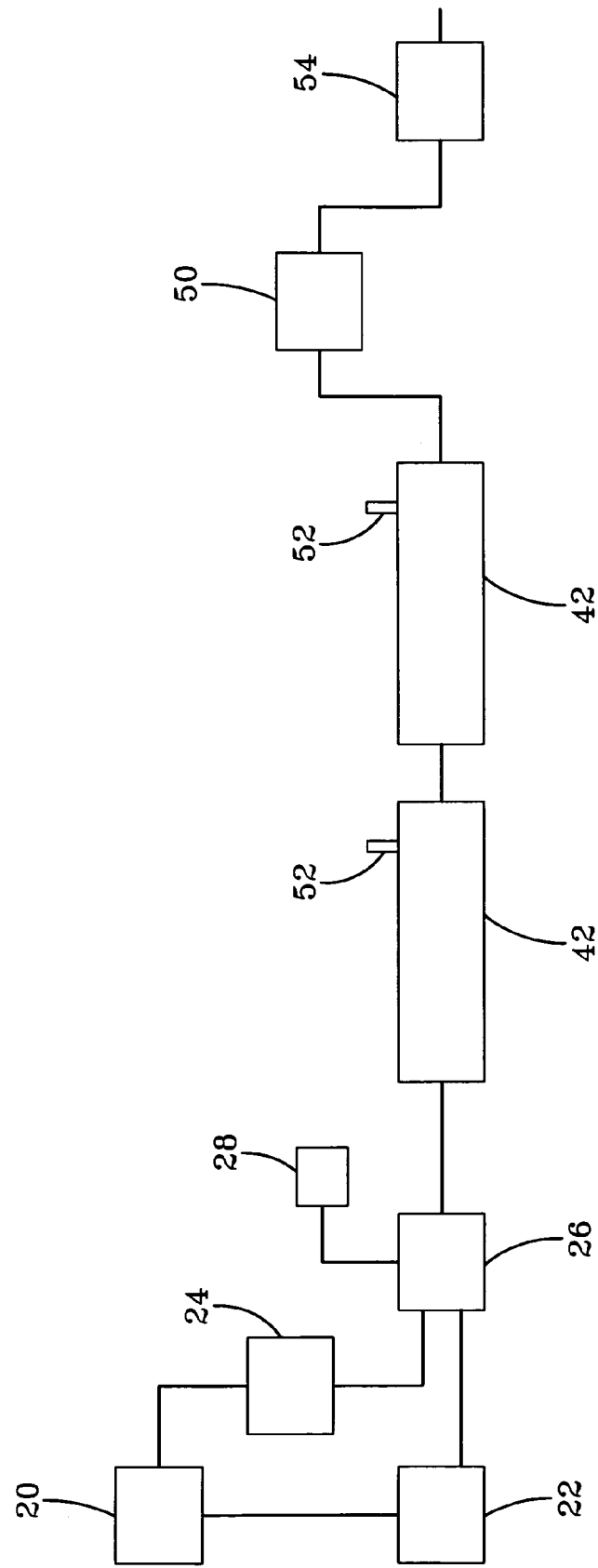
FIG. 4 is a schematic view of an assembly line for performing a manufacturing process according to a preferred embodiment of the invention.

The wall base 2 can be manufactured relatively quickly and easily because of its generally hollow core. Wall base 2 is made from a thermoplastic plastic material suitable for extrusion. The materials include those known in the art, such as any of the appropriate types of vinyl, PVC, or rubber (including synthetic rubber). Referring to FIG. 4, the raw materials are supplied to the extruders from a conventional supply unit 20. The plastic or similar material is preferably extruded from two separate extruders, a main extruder 22, and a side extruder 24 as shown in FIG. 4. Extruders 22, 24 can be standard extruders known in the art for manufacturing wall bases of similar configuration to that of wall base 2 although generally being of thinner configuration since the prior units were thicker. The main extruder 22 heats the raw material to put it into an extrudable state and extrudes through appropriate dies a back layer material 16 (FIG. 2) which makes up about 90% of the finished wall base 2, including the front wall 6 having the profile of wall base 2. The side extruder 24 likewise heats the raw material to a fluid state and extrudes it through appropriate dies to yield a thin top coat layer 18 shown in FIG. 2, preferably having a thickness of about 0.040 of very high quality material for a wall base having a height of about 5.5 inches and a maximum thickness of about 0.75 inches. This is referred to as high quality material because it is a highly pigmented, no filler top coat. This very high quality material represents about 10% of the finished wall base material used. The softened plastic flow during extrusion does not cool sufficiently to impede further flow through the respective dies and along the extrusion production line. Because there is less plastic flowing through this system than found in the prior art, a multiple piece die 26 shown downstream of extruders 22, 24 stays hotter and thus the plastic flows quickly to reduce production time. The multiple piece die 26 is comprised of multiple machined parts that allow semi molten material to flow from the die. The extrusion material is forced through the die by the force generated by the extruder. As the material passes through the die 26, it is formed into the shape of the wall base.

Die 26 establishes the profile of wall base 2 by defining the shape of front wall 6 and rear wall 4, and the cavities 12, 15, 17 and 25. As explained earlier, the cavities or voids 12, 15, 17, 25 make the finished product much lighter and easier to manipulate than a wood or solid plastic wall base. In a preferred embodiment, the wall base 2 is ¾ inches thick at the widest point and is 5.5 inches tall. The rear wall 4 can have ribs, grooves, a mixture thereof or other surface roughness on its exterior face to which adhesive could be applied during installation which would impede the flow of adhesive from rear wall 4.

The generally uniform wall thickness provides a fairly constant thickness for uniform cooling. However, the temperature must be low enough to prevent sagging under its own weight. Uniform cooling is required to obtain a smooth, finished look and profile of the wall base.

The process used to create the hollow wall base is preferably as follows, with reference to FIG. 4. Thermoplastic materials, such as vinyl, PVC or thermoplastic rubber, in the form of pellets, granules or powder from a supply unit 20 which is advantageously a pellet supplier, flow or are otherwise transported into both the main extruder 22 and the side extruder 24 which both feed into the multiple piece die 26 with a multi-functional insert 27 described below. As described above, the wall base back layer 16 flows from main extruder 22 and top coat layer 18 flows from side extruder 24. An air supply 28 is connected to the face of the die 26 to provide air pressure to assist in forming the spaces or chambers 12, 15, 17 and 25 within the wall base 2. The outer side or profile of the front wall 6 of the wall base 2 is formed by the profile cut into or otherwise provided in the die 26, and the internal chambers are formed by the die insert 27 as described below.

Figure 5:
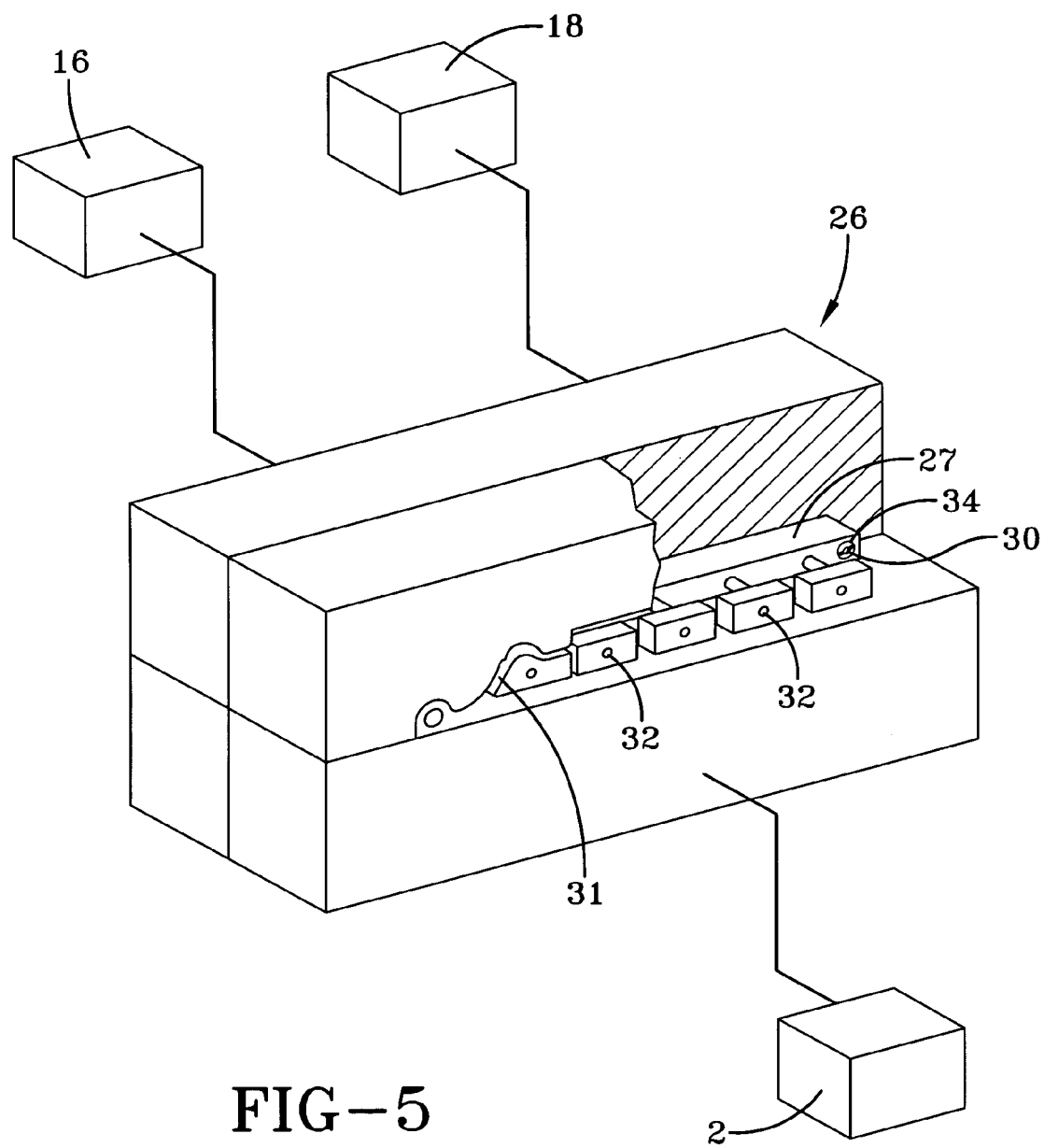
FIG. 5 is a detailed view of some of the apparatus of the assembly line shown in FIG. 4.

The insert 27 is attached to the die 26 by screws 34 within mounting holes, one on each side of the insert, as shown in FIG. 5. The insert 27 has a hollow back bar (not shown), allowing air to pass through the insert and into the forward facing ends of the die 26. There are two screws 34 that hold the insert 27 in place within the die 26. Each screw 34 is drilled through its length creating air inlets 30, and an air line is connected to one of the screw heads, generally on the right side of the die. The air passes through the screw, into the hollow back bar of the insert, and out through the holes 32 in the front of the insert 27.

The insert 27 is made up of machined parts, which are positioned to allow the softened fluid plastic material to flow around them to form both the profile and the various internal chambers 12, 15, 17, 25 of the wall base 2, leaving voids in the areas of the machined parts. Turning first to the profile, a gap 31 is provided around insert 27 when it is mounted in die 26. Fluid plastic material, formed from both back layer 16 and top coat 18 fused together, flow through the gap 31 to define the profile. The remainder of the back layer 16 flows around and encapsulates the insert 27. Second, to facilitate the internal chambers, compressed air is introduced from air supply 28 (FIG. 4) into the insert 27 through air inlets 30 and this air escapes through holes or air outlets 32 in the insert 27, into the hollow chambers 12 being formed of the wall base. The addition of air from the air supply 28 helps the wall base form its shape by allowing the base to collapse under its own weight while the material is still soft and not yet fixed or hardened into its permanent shape. This process is described in more detail below. The material must be cooled quickly in order for the material to retain its shape. Cooling the wall base causes the material to harden and retain its shape.

Main extruder 22 can be a 6 inch Thermatic Davis Standard. The side extruder 24 can be a 2.5 inch Davis Standard. The die 26 can form wall base 2 with one of various profiles such as a wedge-shaped base with a lip at the bottom, an undulating profile on a flat surface or the like, since insert 27 can be configured to produce numerous shapes which can have flat, regular or irregular curves, various inclines and the like. An embodiment of wall base 2 shown in FIG. 1 has a flat lower front portion 11 and an undulating upper portion having a generally semi-hemispherical top bead 23, curved portion 13 and an elongated recess 40. A separate die is used for each style of profile.

Within the die 26, as shown in FIG. 4, the extruded solid plastic is formed into the desired profile with chambers 12. Material flows through die 26, and it takes from between 1 and 2 seconds for the material to enter and leave die 26. The temperature in the die is between 300° F. and 325° F. During this extrusion process, the front wall 6 is separated from the internal supporting members 14 momentarily for about 2 to 3 seconds by the addition of continuous air pressure of about 2 psi through the air inlets 30. Water is applied to cool the front wall 6 by running water over the front wall 6 through a series of water hoses in the cooling tanks 42. Cooling adds stability and flatness to the face. The cooling and loss of air pressure causes the front wall 6 to lower itself to the supporting members 14, resting upon them.

The wall base back layer material 16 and thin top coat layer 18 are completely fused together in die 26, creating a fluid plastic material, through a combination of pressure created by the movement of material through the extruders and the resistance of that material moving through the restrictive opening in the die and the internal heat at a temperature of about 325° F. of the wall base material. This generates a maximum pressure of about 3000 psi within the die.

Figure 2:
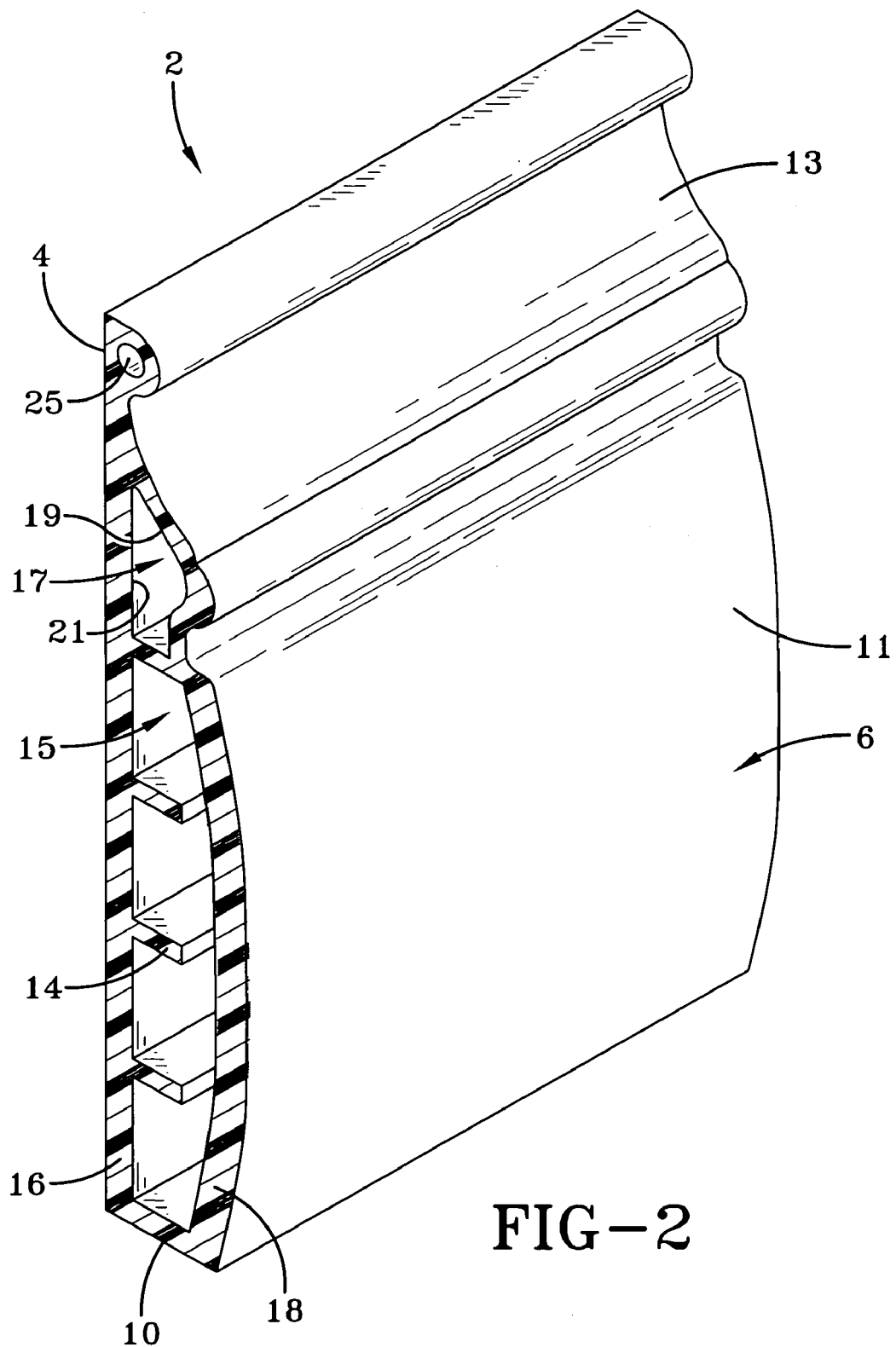
FIG. 2 is a perspective view of the wall base during the extrusion process.
Figure 3A:
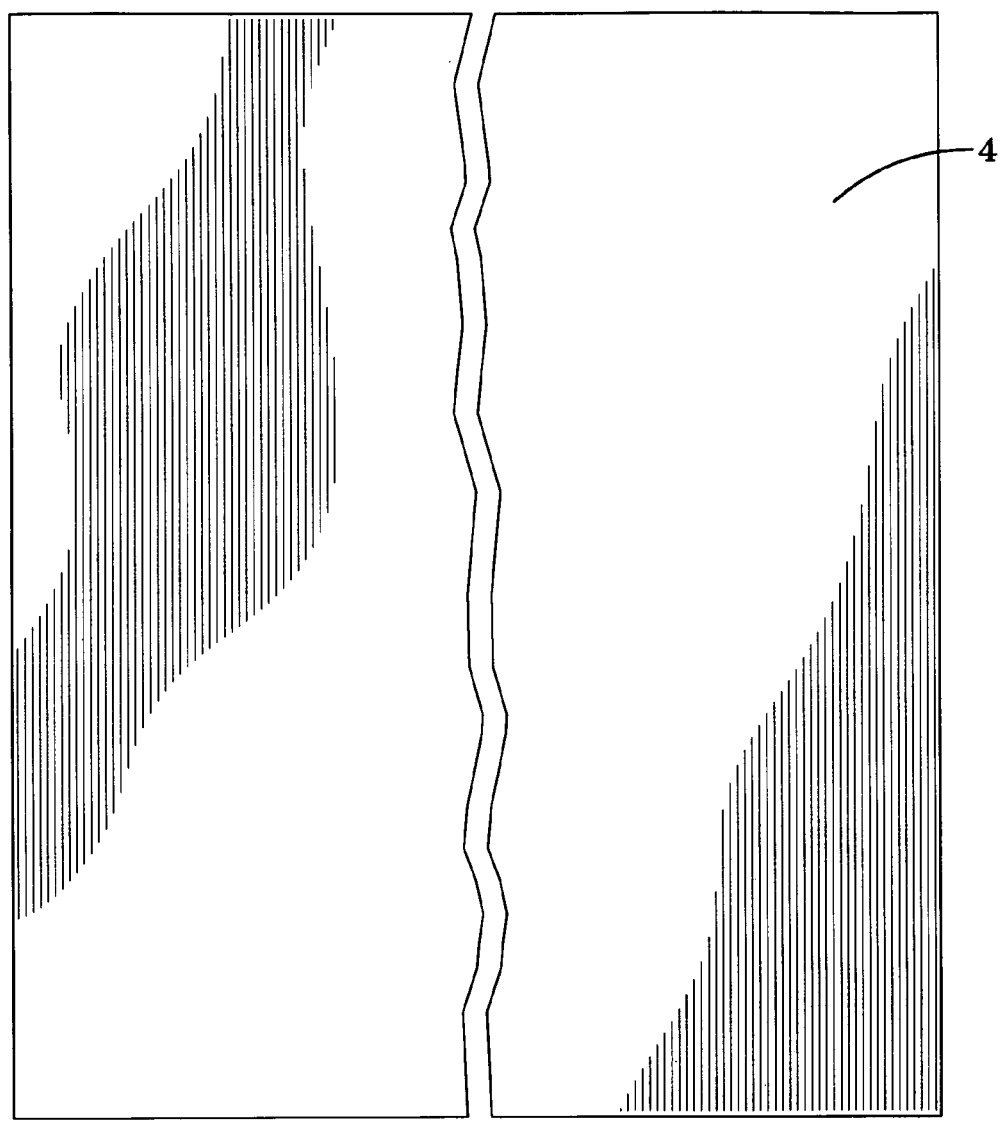
FIG. 3a is a back view of the wall base.
Figure 3B:
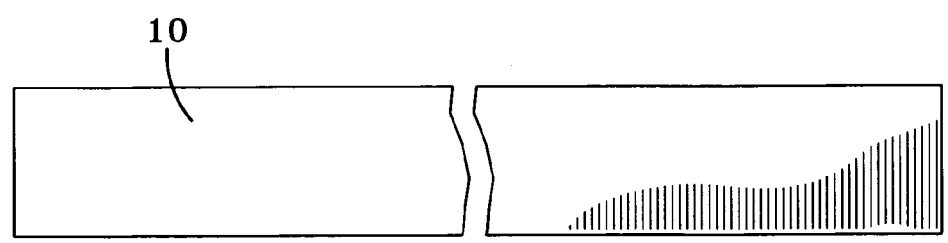
FIG. 3b is a bottom view of the wall base.

The internal heat of the front wall 6 and the supporting members 14 fuses the front wall to the supporting members. The wall base 2 material is pushed through and out of the die 26 under the pressures created by the extruders 22 and 24. As the wall base is extruded, the internal chambers or voids 12 are clearly visible. The open end of the wall base 2 (between the free ends of supporting members 14 and front wall 6), shown in FIG. 2, is closed by hand by pinching this open end between the thumb and fingers, to seal the chambers 12, because the material is still hot enough to stick to itself. Cooling water is thus prevented from entering the chambers when the wall base is placed into the cooling water tanks 42. From the die 26, the wall base 2 is initially manually pulled the length of the two cooling tanks by the extruder operator until the material reaches the mechanical or power puller 50. Each of the tanks 42, which, in a preferred embodiment, can be either a 30 foot (9 meter) or 40 foot (12 meter) trough, has at least one faucet 52; the tank can be on wheels enabling it to move towards and away from the die 26. The bath has chilled water with a temperature range of 50° F. to 60° F. (10° C. to 16° C.), to cool the extruded flexible wall base 2 whose temperature upon entering the bath exceeds 300° F. (150° C.).

After emerging from the cooling tanks 42, the wall base 2 is engaged by mechanical or powered puller 50. The puller 50, which can be a Goodman, is maintained at a constant speed which can range from 15 to 20 FPM to ensure consistent size of the extruded wall base as it is pulled from the die 26. The extruded wall base 2 then passes into a cutter 54 and is cut to a pre-determined or desired length. The wall base is normally cut at a length of eight feet, but can be cut at any length, and proper packaging should be made available. The temperature of the extruders 22, 24, which can range from 275° F. to 350° F., the machine speed settings, which range from 20 RPM to 40 RPM on the extruders, and the powered puller's 50 speed settings control the size or thickness of the wall base 2. These settings must be fixed initially and monitored to assure size consistency. Once operating speeds and part size are established, the wall base is cut and packaged for shipment.

Installation of the wall base is straightforward. The wall base 2 is cut to the desired length or removed from its packaging or both at the installation site. Adhesive is applied to the back of the wall base. The wall base is applied to the wall, using the bottom as a locator and leveler against the floor, assuming the bottom 10 rests on the floor and the floor is sufficiently flat. Otherwise, other leveling and locating means known in the art are used. If desired, wires can be fished through the wall base during the installation process, either prior to the attachment of the wall base to a wall during which time the wall base can be moved, or after installation. An appropriate tool could be used to grasp the wire and pull or push it through a selected opening or hollow chamber 12. In contrast to prior art, the installation of wires into the wall base is straightforward because the wires are supported by the wall base as they are fished through it; in the prior art, the wires must be laid or placed into a baseboard, which is a more cumbersome process.

The present invention solves a prior problem of wall bases which are expensive, heavy and inflexible. The inventive product has more uniform thickness and can be made with fewer surface and dimensional imperfections and can be extruded faster because of the lower wall thickness. This is so even though the inventive wall base apparently has varying thicknesses which were not previously possible in large scale commercial processes using plastic or rubber materials. The lighter weight wall base is also easier to cut and to install, and less expensive to ship than a heavier, solid wall base. However, after installation, the product appears to be solid, emulating more expensive wall bases.

The invention has been described with particular emphasis on the preferred embodiments. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention or the equivalents thereof.

What is claimed is:

1. A method for making a hollow wall base from an extrudable thermoplastic material, said method comprising the steps of:

extruding heated back layer material from a first extruder;

extruding heated top coat layer from a second extruder;

fusing said top coat material onto said base material, forming fluid plastic material;

passing said fluid material into a die, the die having multi-functional inserts for forming a profile and spaces in the wall base to provide generally uniform wall thickness, the fluid material passing over the multi-functional insert;

applying air under pressure through appropriate passages in said die to temporarily lift and detach a front wall from said fluid material;

running cool water onto said front wall to cool said front wall;

pulling said wall base into at least one cooling tank, cooling said wall base;

using a mechanical puller to pull said wall base out of said at least one cooling tank;

passing said wall base into a cutter to cut the wall base into desired lengths;

and withdrawing the wall base.

2. The method according to claim 1 wherein the temperature in the die is between 300° F. and 325° F.

3. The method according to claim 1 wherein air pressure of about 2 psi is applied for about 2 to 3 seconds.

4. The method according to claim 1 wherein the profile formed by the multi-functional inserts is a wedge-shaped base with a lip at the bottom.

5. The method according to claim 1 wherein the profile formed by the multi-functional inserts is an undulating profile on a flat surface.

6. The method according to claim 1 wherein the profile formed by the multi-functional inserts is one of regular and irregular curves.

7. The method according to claim 1 wherein the profile formed by the multi-functional inserts is multiple inclines.

8. The method according to claim 1 wherein the die is steel.

* * * * *